US011783299B2

(12) United States Patent
Ferre et al.

(10) Patent No.: US 11,783,299 B2
(45) Date of Patent: *Oct. 10, 2023

(54) SHARING EVENTS WITH STRUCTURED METADATA

(71) Applicant: Microsoft Technology Licensing, LLC, Redmond, WA (US)

(72) Inventors: Juan Diego Ferre, Seattle, WA (US); Devi Jalakandapuram Viswanathan, Redmond, WA (US); Roshin Lal Ramesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,391

(22) Filed: Jan. 31, 2022

(65) Prior Publication Data

US 2022/0156703 A1 May 19, 2022

Related U.S. Application Data

(63) Continuation of application No. 15/588,273, filed on May 5, 2017, now Pat. No. 11,270,268.

(51) Int. Cl.
*G06Q 10/10* (2023.01)
*H04L 51/046* (2022.01)
*H04L 51/00* (2022.01)
*G06Q 10/1093* (2023.01)
*G06Q 10/109* (2023.01)
*H04L 51/214* (2022.01)

(52) U.S. Cl.
CPC ....... *G06Q 10/1095* (2013.01); *G06Q 10/109* (2013.01); *H04L 51/046* (2013.01); *H04L 51/214* (2022.05)

(58) Field of Classification Search
None
See application file for complete search history.

(56) References Cited

U.S. PATENT DOCUMENTS 7,158,980 B2 * 1/2007 Shen ................ G06Q 10/107
707/999.102
8,019,863 B2 * 9/2011 Jeide .................. H04L 67/1095
709/224

(Continued)

FOREIGN PATENT DOCUMENTS

| CN | 102204194 A | 9/2011 |
| CN | 102411741 A | 4/2012 |
| CN | 105745637 A | 7/2016 |

OTHER PUBLICATIONS

"Office Action Issued in Indian Patent Application No. 201947046837", dated Feb. 4, 2022, 7 Pages.

(Continued)

*Primary Examiner* — Eric W Stamber
*Assistant Examiner* — Ashley Y Young

(57) ABSTRACT

When sharing events between users, the sharing users and the recipient users often have different relationships with details of the events. An event structurer enables sharing users to share events via a single user interface with recipients and tailor what aspects of the events are shared, thus ensuring the relevant portions of the events are properly presented to new recipients based on their new relationship with the event's details.

20 Claims, 13 Drawing Sheets

(56) References Cited

U.S. PATENT DOCUMENTS

| | | | | |
|---|---|---|---|---|
| 8,166,019 | B1* | 4/2012 | Lee | G06Q 10/02 707/963 |
| 8,463,859 | B2* | 6/2013 | Provo | G06Q 10/10 709/248 |
| 8,719,397 | B2* | 5/2014 | Levi | H04L 51/214 709/224 |
| 9,116,986 | B1 | 8/2015 | Jackson et al. | |
| 2005/0138631 | A1* | 6/2005 | Bellotti | G06Q 10/06 719/310 |
| 2007/0016646 | A1* | 1/2007 | Tendjoukian | G06Q 10/109 709/206 |
| 2007/0244976 | A1* | 10/2007 | Carroll | G06Q 10/109 709/206 |
| 2009/0077570 | A1* | 3/2009 | Oral | G06Q 10/109 719/318 |
| 2009/0210351 | A1* | 8/2009 | Bush | G06Q 50/188 705/80 |
| 2009/0210391 | A1* | 8/2009 | Hall | G06F 16/9535 |
| 2009/0235280 | A1* | 9/2009 | Tannier | G06Q 10/00 719/318 |
| 2010/0076802 | A1* | 3/2010 | Bhogal | G06Q 10/1095 705/7.19 |
| 2010/0269049 | A1* | 10/2010 | Fearon | G06Q 10/109 715/752 |
| 2011/0040895 | A1* | 2/2011 | Griffin | H04L 67/567 709/248 |
| 2011/0093619 | A1* | 4/2011 | Nelson | H04L 67/04 709/248 |
| 2011/0106892 | A1* | 5/2011 | Nelson | G06Q 10/109 709/206 |
| 2011/0125545 | A1* | 5/2011 | Lehmann | G06Q 10/109 707/769 |
| 2011/0153629 | A1* | 6/2011 | Lehmann | G06Q 30/06 707/E17.014 |
| 2011/0202854 | A1 | 8/2011 | Chan et al. | |
| 2012/0265528 | A1* | 10/2012 | Gruber | G10L 15/183 704/235 |
| 2012/0324002 | A1* | 12/2012 | Chen | G06F 16/51 709/204 |
| 2013/0090973 | A1* | 4/2013 | Hui | G06Q 10/06 705/1.1 |
| 2014/0040748 | A1* | 2/2014 | Lemay | G06F 3/04817 715/728 |
| 2014/0095597 | A1* | 4/2014 | McNeil | G06Q 50/01 709/204 |
| 2014/0136630 | A1* | 5/2014 | Siegel | G06Q 10/107 709/206 |
| 2014/0237380 | A1 | 8/2014 | Kurrus et al. | |
| 2014/0249878 | A1* | 9/2014 | Kaufman | G06Q 10/1095 705/7.19 |
| 2014/0288990 | A1 | 9/2014 | Moore et al. | |
| 2014/0337441 | A1* | 11/2014 | Schnitman | H04L 51/08 709/206 |
| 2015/0058873 | A1* | 2/2015 | Newell | H04N 21/26283 725/34 |
| 2015/0081369 | A1* | 3/2015 | Sarrazin | G06Q 10/107 705/7.18 |
| 2015/0088927 | A1* | 3/2015 | Sarrazin | G06F 16/148 707/769 |
| 2015/0278199 | A1* | 10/2015 | Hazen | G06F 40/40 704/9 |
| 2015/0347979 | A1 | 12/2015 | Fasen et al. | |
| 2016/0188700 | A1* | 6/2016 | Kleinschnitz, Jr. | G06F 16/285 707/738 |
| 2017/0124518 | A1* | 5/2017 | Leske | G06Q 10/1095 |
| 2017/0134901 | A1* | 5/2017 | Uyanik | H04L 67/125 |

OTHER PUBLICATIONS

"First Office Action and Search Report Issued in Chinese Patent Application No. 201880029810.6", dated Dec. 2, 2022, 19 Pages.

"Notice of Allowance Issued in European Patent Application No. 18720909.3", dated Oct. 21, 2022, 8 Pages.

"Notice of Allowance Issued in European Patent Application No. 18720909.3", dated Feb. 2, 2023, 2 Pages.

"Notice of Allowance and Search Report Issued in Chinese Patent Application No. 201880029810.6", dated May 10, 2023, 8 Pages.

* cited by examiner

SHARING EVENTS WITH STRUCTURED METADATA

CROSS-REFERENCE TO RELATED APPLICATION PAPERS

This application is a continuation of U.S. application Ser. No. 15/588,273, filed May 5, 2017, and which application is incorporated herein by reference in its entirety. A claim of priority is made to the above disclosed application.

BACKGROUND

Users of email and calendaring applications often share messages that they have received by forwarding those messages to a new recipient. Similarly, new attendees can be invited or assigned action items related to an existing calendar event by forwarding an invitation. As email systems have gained sophistication, one service offered to users is the ability to parse incoming messages to identify relevant event metadata within the message and automatically create events in the user's calendar based on those event metadata. When messages or calendar events are forwarded, these event metadata may have different relevancy for the new recipient/invitee than the sharing user, which causes difficulties in the automatic provision and parsing of the metadata.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying processor executable instructions for sharing events with structured metadata are provided herein. In one aspect, an email message is received from a source and is parsed to identify any event metadata it contains from which an event is automatically created for the original recipient. In another aspect, details from an existing event are selected for use as event metadata. The sharing user selects new recipients and roles for those new recipients via a user interface integrated into a mail and/or calendar application. Selected event metadata, and their relationship to the new recipients, are integrated into an email message, which is then shared to the new recipients. The new recipients are provided the event metadata—originally relevant to the sharing user—in a context relevant to the new recipients. In various aspects, receiving users configure whether calendar events are automatically created upon receipt or may be created in response to user acknowledgement/acceptance of the shared event metadata.

By sharing events with structured metadata as described in the present disclosure, increases in computational efficiency and reductions in bandwidth usage are realized, while an improved user experience (for both sharing and new receiving users) is provided. Users are thereby provided tools to efficiently and easily share events with one another that require less data to be transmitted between mail and calendar servers with greater fidelity to the event's meaning to the individual users.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
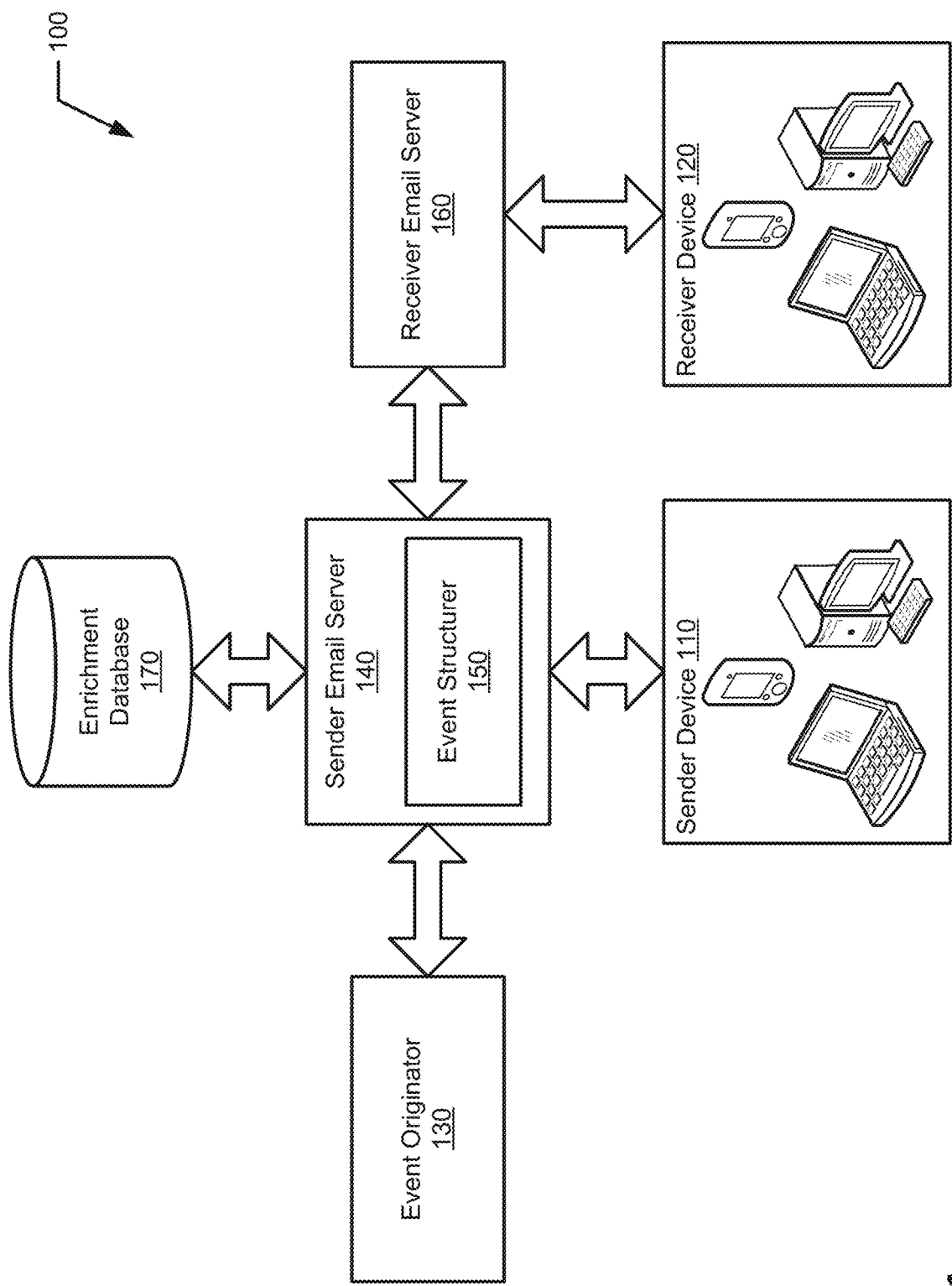
FIG. 1 is an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 illustrates and example operating environment 100 in which the present disclosure may be practiced. As illustrated, a sender device 110, associated with a sender (also referred to as an original recipient, a sharing user, a sharer, and variations thereof), shares an event with one or more receiver devices 120, associated with one or more new recipients (also referred to as receivers, invitees, and variations thereof). In various aspects, the event that is shared originated from an email sent from event originator 130 or a user-created event originating from the sender device 110. A sender email server 140 including an event structurer 150 is in communication with the sender device 110, the event originator 130, a receiver email server 160, and an enrichment database 170. In some aspects, the sender email server 140 and the receiver email server 160 are the same email server. In additional aspects, the enrichment database 170 is a component of the sender email server 140 or an externally maintained database.

The sender device 110, receiver device 120, event originator 130, sender email server 140, event structurer 150, receiver email server 160, and enrichment database 170 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 4-6.

While the sender device 110, receiver device 120, event originator 130, sender email server 140, event structurer 150, receiver email server 160, and enrichment database 170 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The sender device 110 and the receiver device 120 provide email and calendaring applications for their respective users. In various aspects, these applications provide email and calendaring functions via separate applications (e.g., a first application providing email functionality, a second application providing calendaring functionality) or via integrated applications (e.g., an email and calendaring application). The devices are operable to provide one or more calendaring applications associated with various accounts or profiles for their users, such as, for example, a user may access work email and events via the IBM NOTES® enterprise email client (provided by International Business Machines, Corp. of Armonk, N.Y.) and on the same device access personal email and events via the GMAIL® online email and calendar platform (provided by Alphabet, Inc. of Mountain View, Calif.). The email and calendar applications provided by the sender device 110 and the receiver device 120 include both thick clients (running on the device) and thin clients (running on a remote server and accessed via a web browser), and the sender device 110 and the receiver device 120 do not need to run or access the same email and calendaring applications; each device is operable to use different applications to practice the present disclosure.

The sender email server 140 and the receiver email server 160 provide email and calendar event management for multiple users, including the sender and the recipient. In some aspects, such as when the sender and the recipient are coworkers, the sender email server 140 and the receiver email server 160 are the same device or distributed network of devices (e.g., different physical devices within a cloud computing environment managed as one entity). In other aspects, the sender email server 140 and the receiver email server 160 are different devices that run the same or different applications to manage the provision of email and calendar events to the users. In one example, a sender email server 140 running SENDMAIL® (provided by Sendmail, Inc. of Emeryville, Calif.) is in communication with a receiver email server 160 running EXIM™ (provided at www.exim.org).

The event structurer 150 is configured to parse emails received for distribution to its users and determine whether any event metadata is present in the emails and, if so, to provide the event metadata in a digested format. For example, when an email containing hotel reservation details is received from an event originator 130 of a hotel or travel agent, the event structurer 150 is operable to locate details regarding the hotel stay in the email and break those details out in an easily digested format for the user to read and interact with. In another example, when an email containing package delivery details is received from an event originator 130 of a retailer or delivery service, the event structurer 150 is operable to locate details regarding the time of delivery and location of the package and provide those details to the user to read and interact with in an easily digestible format. The digestible format includes structured arrangements of data elements, infographics, hyperlinks to relevant third party websites (e.g., a check-in website for a flight, a package tracker website, a customer support website), and the like, which can be configured by the user in various aspects. Although only illustrated in conjunction with the sender email server 140, one of ordinary skill in the art will appreciate that the receiver email server 160 will also incorporate an event structurer 150 in some aspects, but that such incorporation is optional.

To parse the emails for event metadata, the event structurer 150 is configured to use the schema.org or another structured data vocabulary to identify terms within an email message and to develop a structure of that information for inclusion in the message delivered to the sender device 110. In various aspects, such as when the email message is formatted as an HTML (Hypertext Markup Language) object, the structured metadata are included in the body field as metadata as a division within the body field. The structured division is provided in a machine readable format for the email and calendaring client to interpret and may be hidden from the user or presented to the user as the easily digestible format depending on whether the email and calendaring client is configured to interpret the structured division. For example, if a user accesses the parsed email via two different clients—one enabled to interpret the structured division and one not—the user will still see the message body of the email in both clients, but only the enabled client will provide the additional functionality of the easily digestible format.

In various aspects, the parsed email is identified as being related to an event, and the extracted data are used by the event structurer 150 to automatically produce a calendar event for the user. For example, an email including data for a flight reservation is parsed, and such data are included in the structure of the email to provide an event corresponding to the flight and travel times for the user. In another example, an email including data for a concert is parsed, and such data are included in the structure of the email to provide an event corresponding to the concert's duration and location (e.g., from 6 pm until 10 pm at the Wiener Staatsoper, Opernring 2). These events are automatically added to the user's calendar or provided to the user to accept as an event invitation message depending on user preferences.

Additionally, based on the extracted metadata from the emails, additional data based on those extracted data are located by the event structurer 150 via an enrichment database 170. For example, if the extracted data include an airport code, a postal code, time zone information, or the like, the data to convert the extracted information will be provided for the airport name or location (e.g., TYS→McGee Tyson in Knoxville, Tenn.), associated city or state (e.g., 90210→Beverly Hills, Calif. or greater Los Angeles area), or localized time information (e.g., 2000 NPT→8:00 pm Nepal Standard Time [UTC+5:45] or 10:15 am EDT). The enrichment database 170 provides various conversions for coded information as well as synonyms, translations, and expanded information (e.g., maps of an identified location, whether a holiday is associated with a time/location) that the event structurer 150 can incorporate into the structured message for provision in the easily digestible format and/or the event.

Event metadata include, but are not limited to: a subject matter, actors/presenters, ratings, attendees, intended audiences, composers, contributors, door times, durations, start/end times, status (e.g., on time, rescheduled, cancelled), language, whether sub/super events exist, descriptions, Uniform Resource Locators (URLs) to access the event or related website, an event type, etc. The event metadata are stored at the sender email server 140 along with the message from which they were parsed so that when a sharing user forwards or shares a message or event with a recipient user, those metadata are included in the sharing message and formatted according to their (different) relationship to the recipient user.

In the course of operation, the sender device 110 will receive emails and calendar events (e.g., invitations) from the sender email server 140 from various sources that have been parsed by the event structurer 150 for event metadata. These event metadata have been parsed from the original message based on their relationship with the user to whom the original message was addressed. For example, the flight times from a flight confirmation message are related to when the user is expected to fly from an origin to a destination. The user, however, may wish to share this information with various other persons who are not ticketed for the flight outlined in the original message, such as, for example, a person who will pick up or drop off the user from/to an airport. These other persons with whom the user shares the message will have a different relationship with the event metadata than the user, and when the user shares the event with these persons, the event structurer 150 provides these other persons (e.g., recipient users) the metadata in accord with the new relationship.

The metadata encoded in the event message by the sending user for various recipients may include all or a portion of the metadata parsed by the event structurer 150 or, when the event was manually created, all or a portion of the metadata for the event may be determined and injected into the event message to be shared with the recipients. Similar to the example message received from the event originator 130 discussed above, the event message encodes the metadata related to the recipients in a machine-readable division of the HTML body of the event message, and designates (e.g., via a field name or value) that the event message is a shared event. The new relationships of the event to the recipients, and the metadata associated with those relationships, are set by the sending user via an interface in the sender's email and calendaring application. An example course of operations and associated example user interfaces (UIs) therefor are illustrated in FIGS. 2A-G.

Figure 2A:
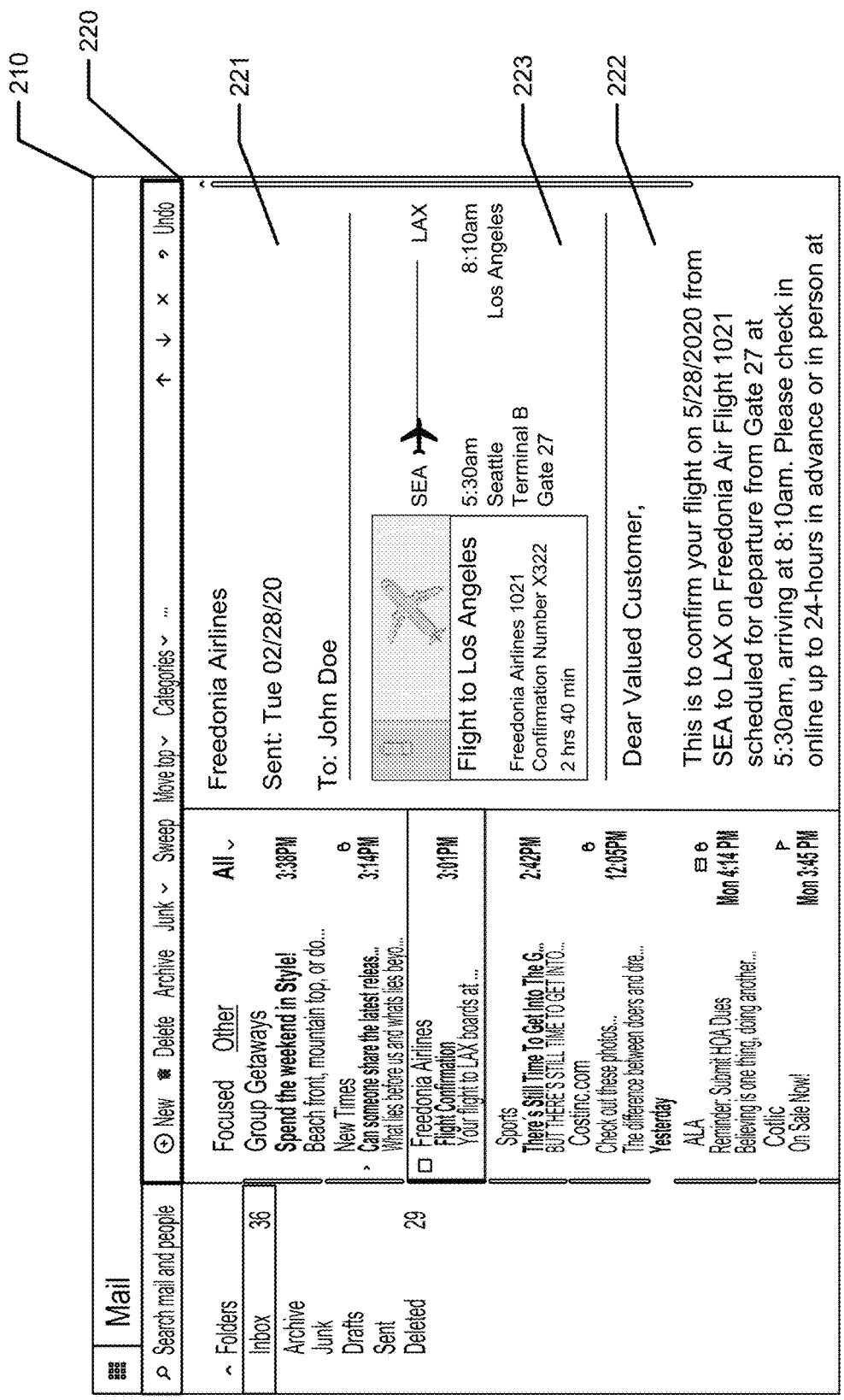
FIGS. 2A-G are example user interfaces in which an example event is shared with structured metadata.

FIG. 2A illustrates a sender email UI 210 in which an email message for a flight is provided with expanded functionality based on the structured data originally present in the message from the event originator 130. Various navigation controls are provided in the sender email UI 210 to enable the sending user to view, delete, and manipulate email messages and event invitations. A message viewing pane 220 is provided to view details about a selected email message, providing transmission information 221, a message body 222, and structured event data 223. In various aspects, the data used to construct the structured event data 223 are parsed from the original message and provided in a machine readable division of the message body. The email client is operable to use the division within the body and provide the associated metadata to the use via various infographics, images, arrangements, and hyperlinks or other controls in an easily digested format. The format shown in FIG. 2A is provided as a non-limiting example, and other arrangements and formats are possible.

Figure 2B:
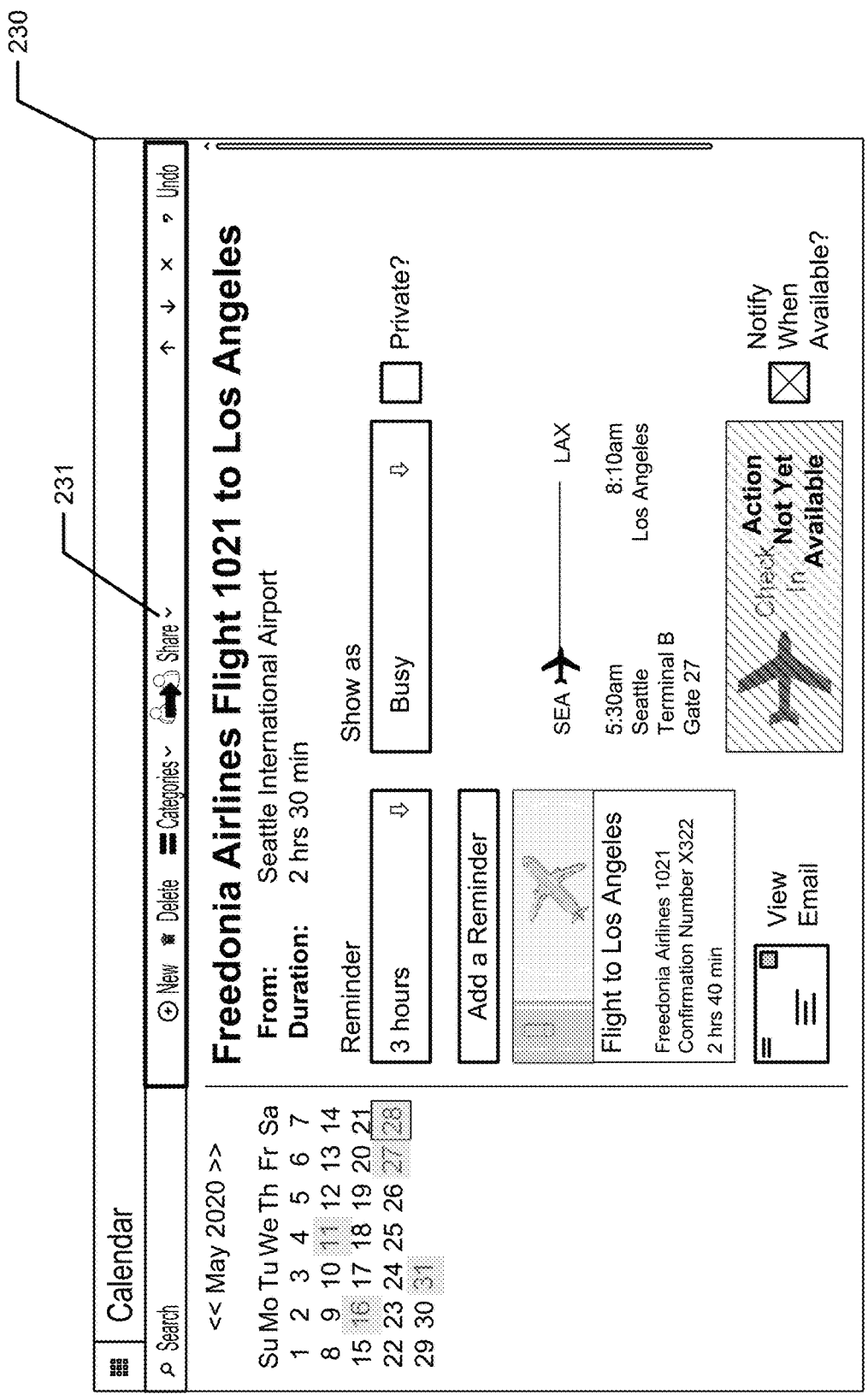

FIG. 2B illustrates a calendar client UI 230 in which the event parsed from the example message from FIG. 2A is provided. Various controls are provided in the calendar client UI 230 to enable to user to interact with the event, such as reminder controls, controls to view the associated email, controls to access links parsed from the emails when available (e.g., the "check in" hyperlink is disabled until the user can check in, typically 24-hours before a flight is scheduled to depart), and information about the event based on the metadata parsed from the original message. One control included in the calendar client UI 230 is a share control 231, which enables the user to format a new message to share the event with additional persons. In various aspects, the share control 231 is bi-actuable, enabling a user to actuate the share control 231 in one of two way to provide two distinct functionalities (e.g., left-click for a first functionality, right-click for a second functionality). In other aspects, two separate controls are provided as the share control 231 to provide each of the functionalities.

Figure 2C:
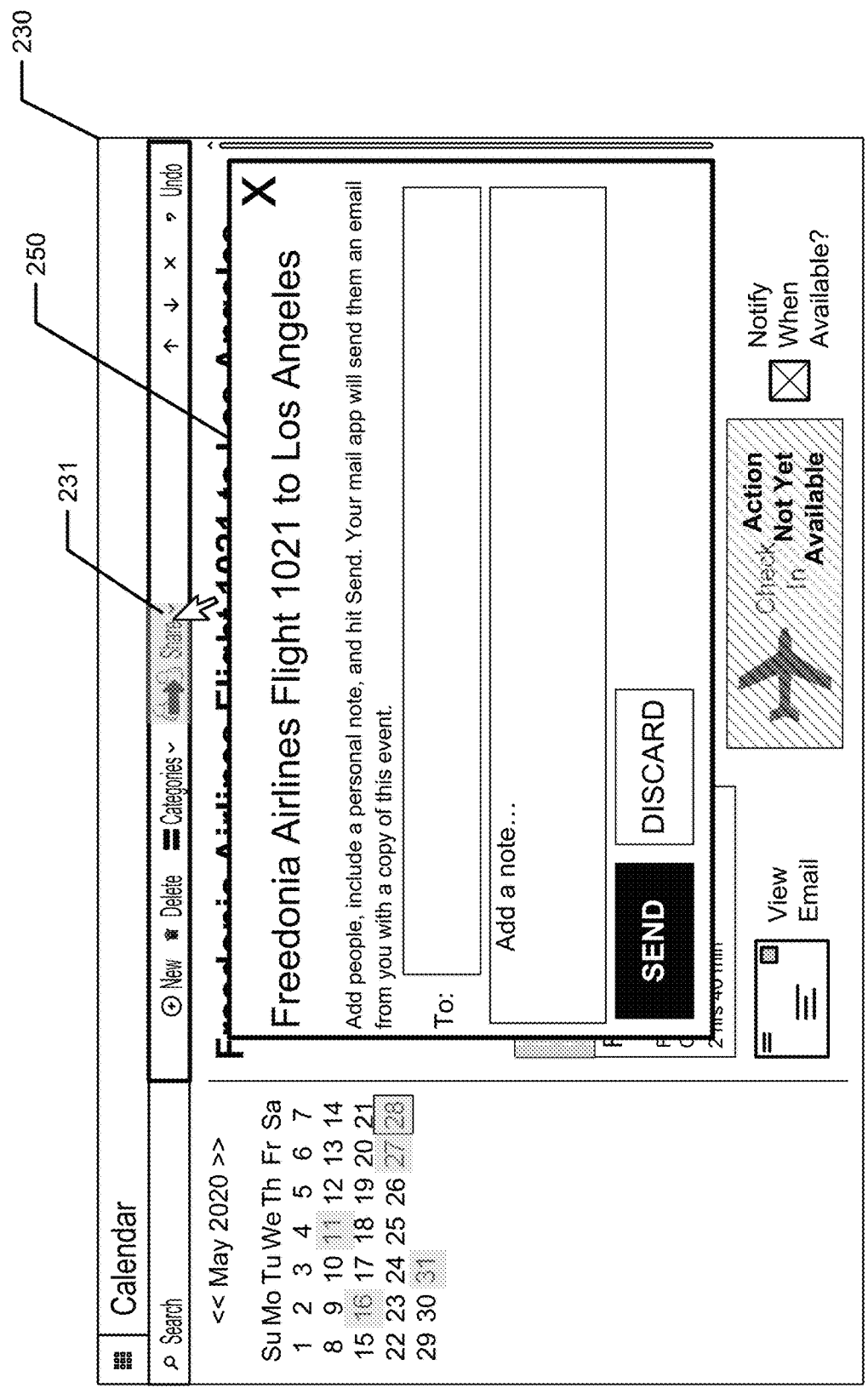

FIG. 2C illustrates a first functionality provided in response to actuating the share control 231, in which a user is provided a sharing UI 240 by which to share the event with one or more recipients. The sharing UI 240 includes controls to title the event, identify recipients with whom to share the event, include a message with the event, send the event, and to cancel sending the event. Although shown as a pop-up window, the sharing UI 240 also includes new windows and new frames in existing windows in other aspects.

As illustrated, the user has selected to share the calendar event that was created from the metadata extracted from an email received from Freedonia Airlines for a flight to Los Angeles. As will be appreciated, a user may share various events based on metadata parsed from received emails (e.g., hotel reservations, concert tickets, package tracking), existing calendar items, as well as events that were manually created by the user.

Figure 2D:
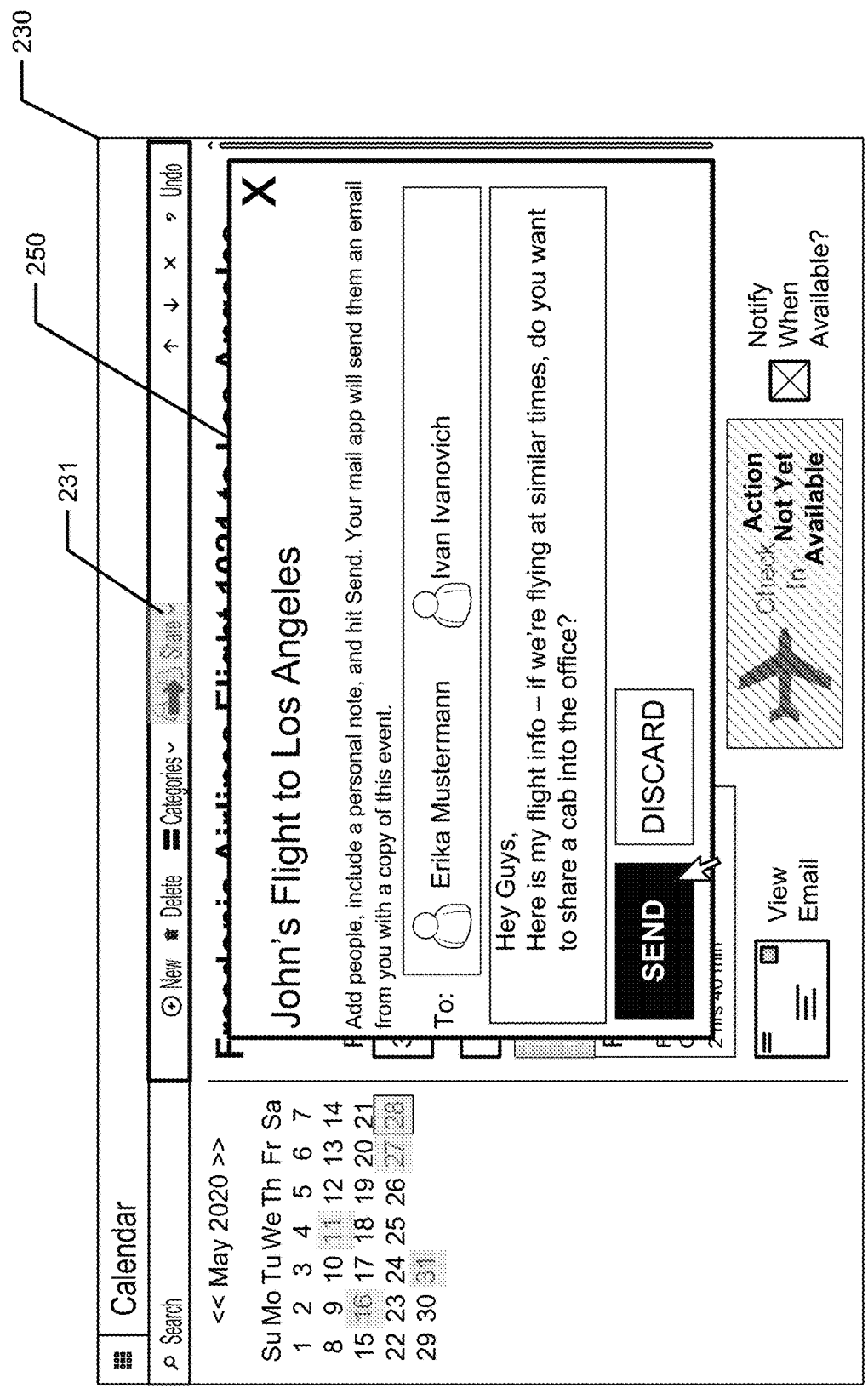

FIG. 2D illustrates the sharing UI 240 in which the user has filled out the several fields, updating the title, identifying two recipients, and adding a message. As illustrated, the user (John Doe) has titled the message to be shared "John's Flight to Los Angeles" instead of the original event's subject, has addressed the message to be shared with two recipients (Erika Mustermann and Ivan Ivanovich), and has included a message to provide details to why the event is being shared. In various aspects, the sharing UI 240 includes more or fewer controls and in different arrangements than those illustrated herein.

Figure 2E:
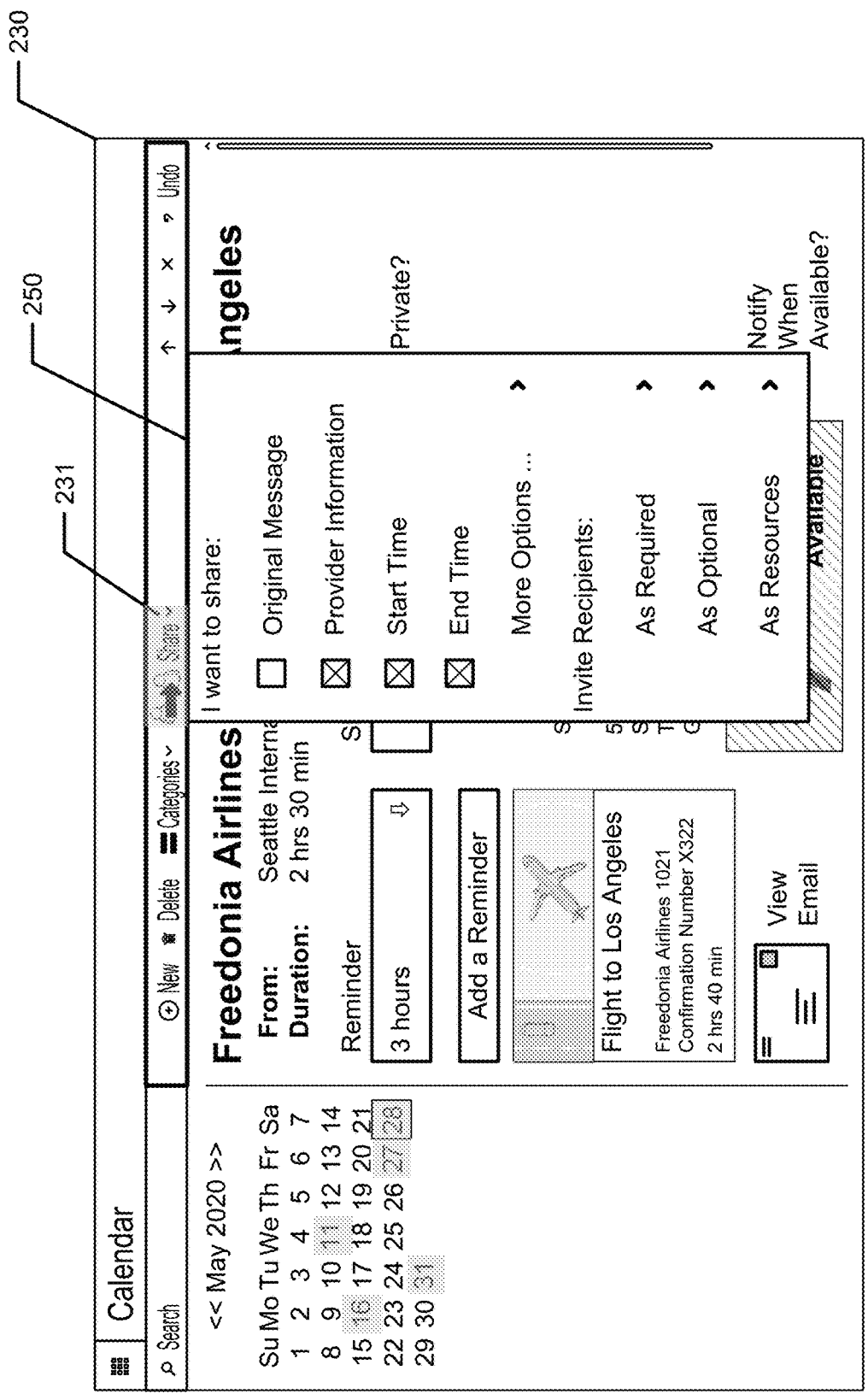

FIG. 2E illustrates a second functionality provided in response to actuating the share control 231, in which a user is provided an options menu 250. The options menu 250 is populated with various controls to enable the sending user to select what metadata are shared with the recipients and how the recipients are shared those metadata. In one example, the parsed metadata from the message are provided as options that the user is enabled to select from to share with various recipients.

As illustrated, John has selected to share "Provider Information", "Start Time", and "End Time" with Erika and Ivan, but has opted not to provide the original message, so that Erika and Ivan will know which airline John is flying with and when, but do not need to be provided with all of John's flight details and will not be provided with the original message, thus focusing the metadata to that (potentially) related to the recipients and thereby reducing the data needed to be transmitted. In another example, if John were asking a different recipient (e.g., Jane Doe) for a ride to the airport, John would be able to exclude the Original Message and the End Time from the message to Jane, who only needs to know when and where John needs to be at the airport he is departing from and not about when he is arriving at his destination. In this example, metadata are excluded from the message to Jane that are extraneous to her potential relationship with the event, thus reducing the amount of data needed to be transmitted to Jane.

In further aspects, the format of the shared message is altered from the original message or event, which enables further improvements in readability and security as well as reductions in data needed to be transmitted to share events. In a first example, the email received by John from Freedonia Airlines that includes a logo image for Freedonia Airlines, a tokenized link for John to login and access his frequent flier account, and special offers from the airline (or its partners) are stripped from the original message when creating a shared message. Thus, distractions, irrelevant information, personalized information, and the like are removed and do not need to be transmitted when sharing the event with the recipients. The removal of these extraneous data is performed (according user preferences) when sharing events as described herein through a sharing UI 240, but also automatically when forwarding email messages and calendar items. As will also be appreciated, the sharing user is enabled to change the order in which information is presented to the recipients from that originally presented in the original message or event to further enhance the readability of the shared message.

Although four options are shown in the options menu in FIG. 2E related to the original message and its metadata, a more options control enables the user to interact with options that are not initially shown, and it will be appreciated that more or fewer options are provided in different aspects. In various aspects, a more options control provides a new window (modal or non-modal), a dropdown or expansion of the options menu 250, or repopulates the options menu 250 with different options.

In various aspects, sharing users are provided templates to select pre-selected portions or sets of the metadata to share with recipients. The templates that the user is enabled to select from include system defined and user defined templates to speed the selection of metadata to include in the shared message. In some aspects, based on the contents of the text entered for the shared message, the email client or event structure 150 is operable to automatically apply a template or to suggest one or more templates to the user if the user has not selected one when attempting to send the shared message.

Figure 2F:
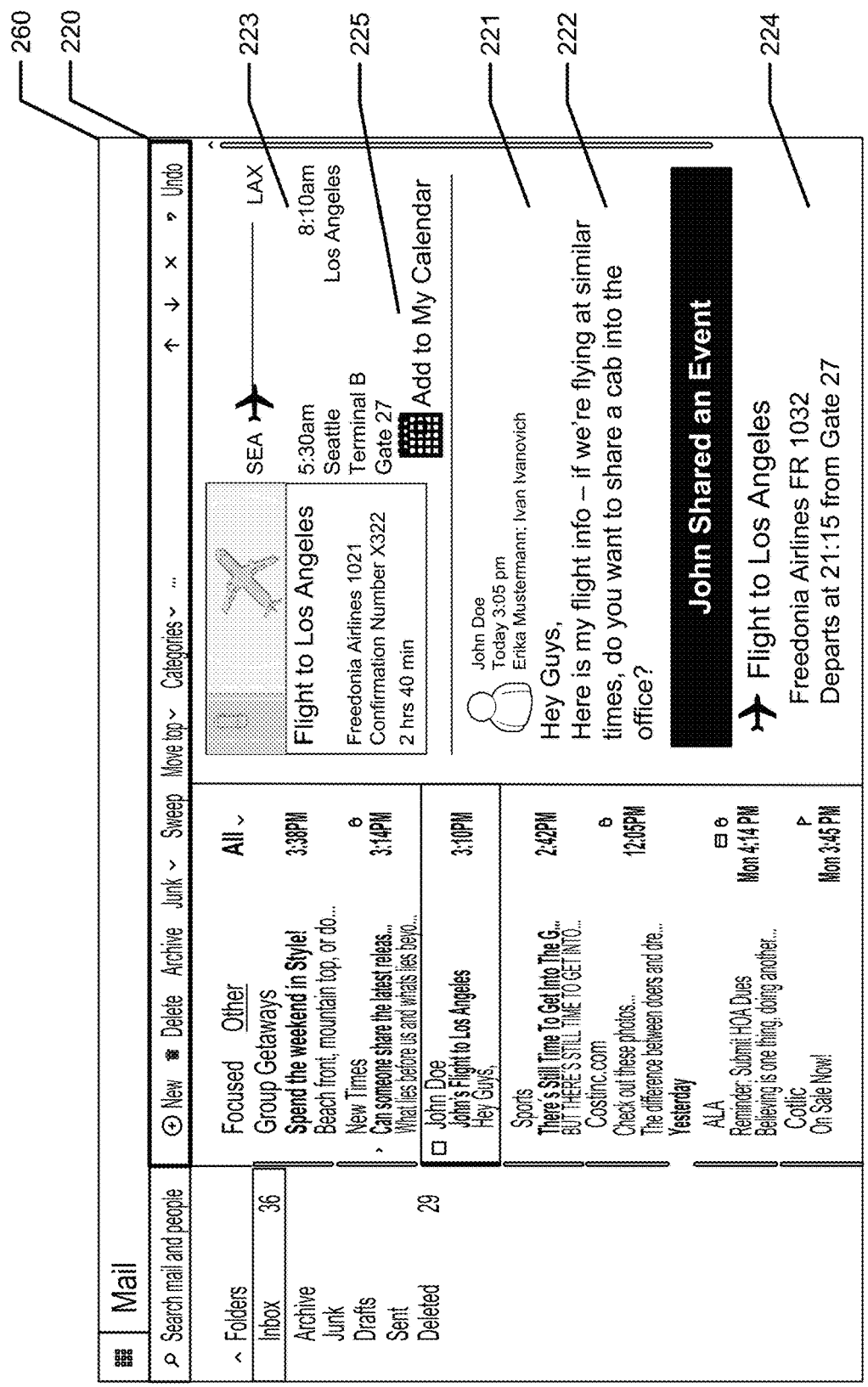

FIG. 2F illustrates a recipient email UI 260 in which the shared event message is displayed with all of the metadata for the shared event. Similar to the sender email UI 210, the recipient email UI 260 includes a message viewing pane 220 for a selected email message that includes transmission information 221, a message body 222, and structured event data 223. Additionally, based on the division encoding the shared event data, the message viewing pane 220 for the recipient email UI 260 includes a sharing notification 224 for the event, indicating that the event has been shared from the sharing user and including additional details on the event and/or initiating email (e.g., attaching the email) and a calendar control 225 to enable the recipient users to add the shared event to their personal calendar. In various aspects, the shared event is not automatically added to the recipient's calendar upon receipt of the event message, but requires the user to actuate the calendar control 225 to accept the shared event onto the recipient's personal calendar. In other aspects, the recipient's user preferences automatically accept shared events from designated sharing users. In yet other aspects, when the shared event is part of the recipient's calendar, the calendar control 225 is actuable to enable the recipient user to remove the shared event from the recipient's calendar.

Figure 2G:
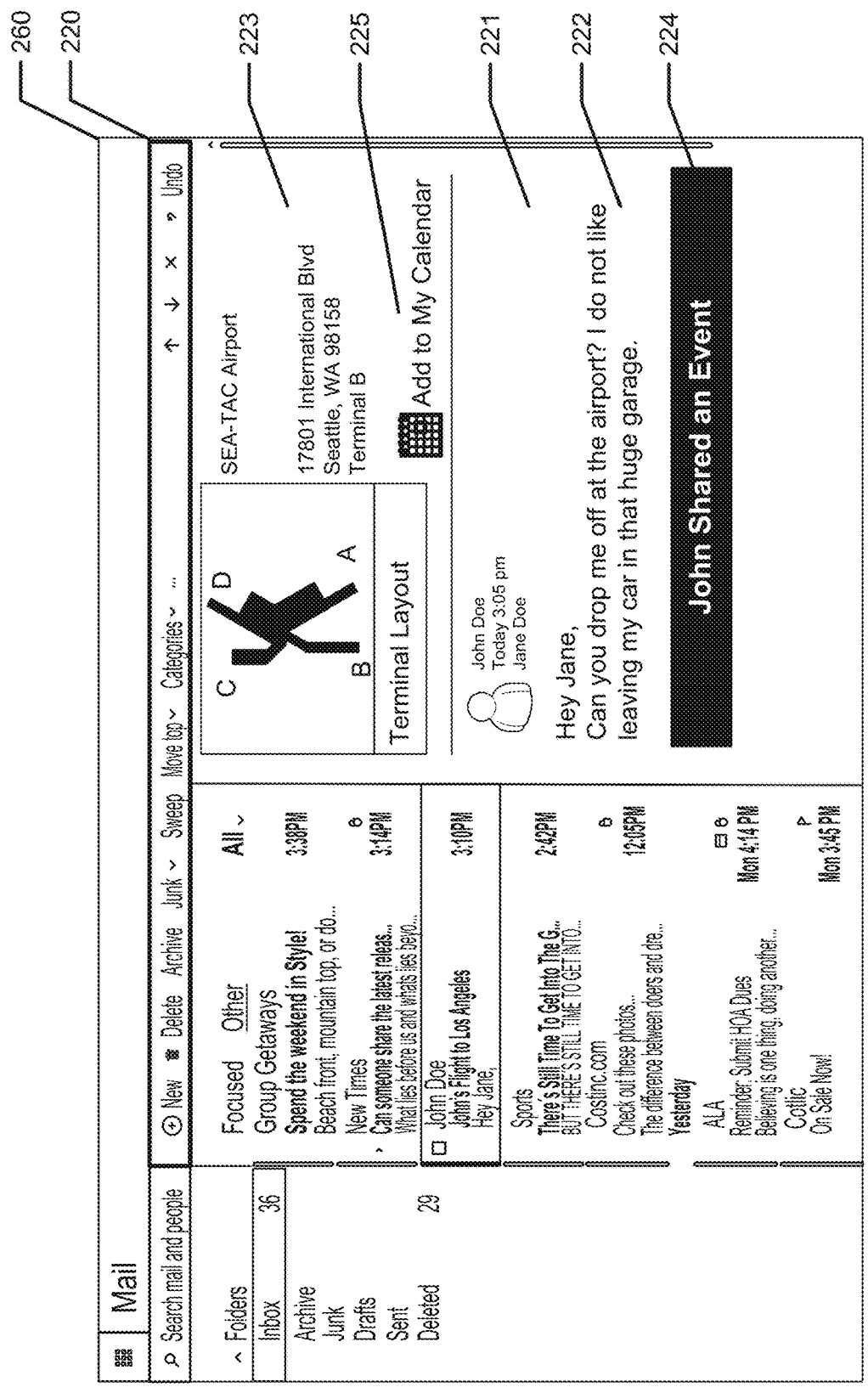

FIG. 2G illustrates a recipient email UI 260 in which the shared event message is displayed with a portion of the metadata for the shared event. In various aspects, the sending user selects for a portion of the metadata unrelated to the recipient's potential relationship to the event to be omitted from the sharing message. Similar to the layout illustrated in FIG. 2F, the recipient email UI 260 includes transmission information 221, a message body 222, and structured event data 223, sharing notification 224, and calendar control 225, but the data presented in the structured event data 223 section reflects the subset of the metadata presented to the recipient user. For example, instead of showing all of the flight details for John that Erika and Ivan would see in FIG. 2F if John shared all of the flight information in the sharing message, Jane would see drop-off details as are illustrated in FIG. 2G if John just shared his departure details.

An event structurer 150 (either at the sender email server 140 or the receiver email server 160) is operable to consult an enrichment database 170 to provide additional data for populating the segment for structured event data 223 in the recipient email UI 260 according to the metadata shared with the particular recipient. In the illustrated example of FIG. 2F, Erika and Ivan, who were provided all of John's flight details, are shown additional details related to the flight event augmented from the included metadata (origin and destination cities, durations, etc.). In the illustrated example of FIG. 2G, Jane, who was provided details related to John's departure, and not provided details of John's arrival in Los Angeles, is shown additional details related to the departure point (SEA-TAC airport) pertinent to her relationship with the event.

Figure 3:
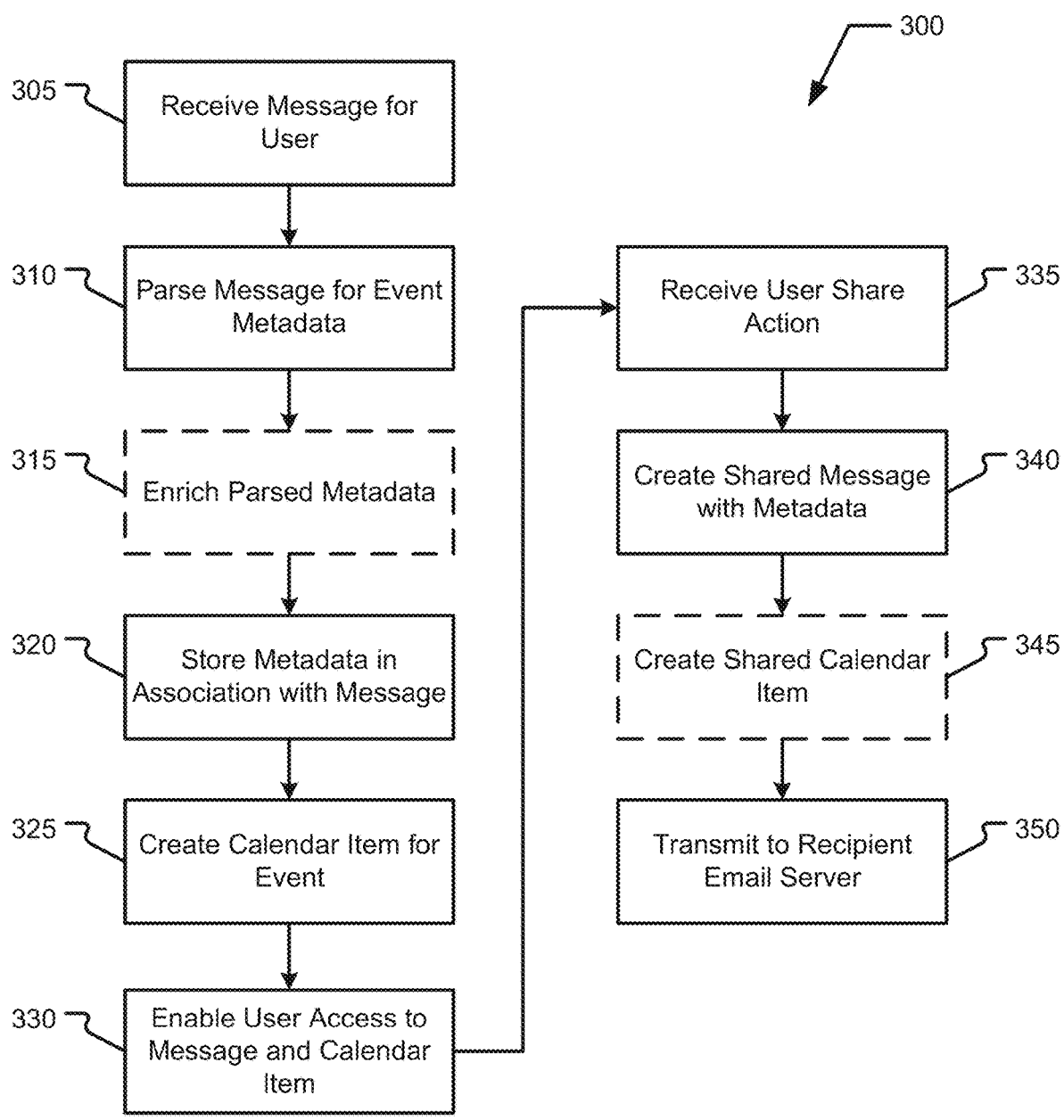
FIG. 3 is a flow chart showing general stages involved in an example method for sharing events with structured metadata.

FIG. 3 is a flow chart showing general stages involved in an example method 300 for sharing events with structured metadata. Method 300 begins with OPERATION 305, where a message detailing an event (such as an email for a flight, hotel, car rental, package delivery, concert, conference, etc.) is received for a user at a server. Method 300 proceeds to OPERATION 310, where the message is parsed for metadata related to the event. For example, an event structurer 150 parses the message for key terms and known arrangements of terms related to event details. The key terms and known arrangements are defined in various schema and vocabulary lists, including those defined in the schema.org or other structured data vocabularies and those defined manually by the user or automatically (e.g., by a machine learning analysis of emails and calendar item) by the event structurer 150.

Method 300 optionally proceeds to OPERATION 315 to enrich the parsed metadata from the message with additional or substitute data. The data used to enrich the extracted metadata are identified in an enrichment database 170 and are used to provide additional details of the event to the user. In one example, expansions of known abbreviations or codes in the event metadata are added to the message. In a second example, maps for identified locations in the metadata are identified and included in the message. In a third example, infographics are developed based on the metadata and included in the message (e.g., a shipment or flight tracker). In a fourth example, when a person related to the event is identified in the event metadata (e.g., a performer, director, presenter, etc.), a biography of that person is identified in the enrichment database 170 and included in the message (e.g., as a hyperlink to a profile webpage for that person).

At OPERATION 320 metadata parsed from the message is stored in association with the message. In various aspects, the parsed metadata are stored in a machine readable division of the body of the message, while in other aspects the parsed metadata are stored in a separate filed linked to the message. Method 300 then proceeds to OPERATION 325, where a calendar item for the event is created for the user based on the parsed metadata. For example, when start and end times are parsed from a message, the calendar item will use those times to define the event in the user's electronic calendar. In other aspects, additional metadata pulled for specific fields are used to title and include details about the event for use in the calendar item. The parsed metadata are associated with the calendar item, either as part of the data defining the calendar item or as a linked reference to an external file.

The user is given access to the message and the calendar item at OPERATION 330. In various aspects, depending on the user's preferences for their email and calendaring applications and the settings of the user's email server, the message and content item are downloaded to the user's device and deleted from the email server, the message and content item are downloaded to the user's device and remain available from the email server, or are accessed at the email server via the user's device.

Proceeding to OPERATION 335, a user share action is received. In various aspects, the user share action originates from an email application or a calendar application (or a given email/calendar functionality of a combined email and calendar application), and references an existing calendar item or an email containing event information that has not yet been added as a calendar item. The user share action identifies a calendar item and some or all of the metadata related to the event represented by the calendar item to share with one or more recipient users identified by the sharing user. A shared message is created in response to the share action at OPERATION 340, which includes the user-specified metadata, which are embedded in a machine readable division of the shared message body for sharing the event to the recipients. In several aspects, the shared message is an HTML email message, which optionally includes a title and a sending-user-defined message for the recipient users, and/or the original message or calendar item as an attachment. In other aspects, such as when optional OPERATION 345 is performed, the shared message is a shared calendar item (such as an event invitation or assignment) that is destined for the recipient user's electronic calendar.

The metadata are organized according to a format readable by the receiver email server 160, such as, for example, the Schema.org format, and may include all or less than all of the metadata that the original message (or calendar item) contains. Additionally, the metadata may be augmented from those parsed from the original message with enrichment data related to the metadata, including, but not limited to: a map for a venue or location related to the event, a hyperlink to a website for an event originator 130 or venue/location of the event, a full name of an entity described in the message by a code, etc.

The shared message is transmitted to the recipient user at OPERATION 350. Once the recipient has accessed the shared message via the associated receiver email server 160, the receiver email server 160 will, depending on its setup and the receiver user's preferences and the abilities of the receiver user's email and calendaring client, provide the recipient with the shared message and optionally create an event for the recipient or provide a control associated with the shared message to add the event to the recipient's calendar.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
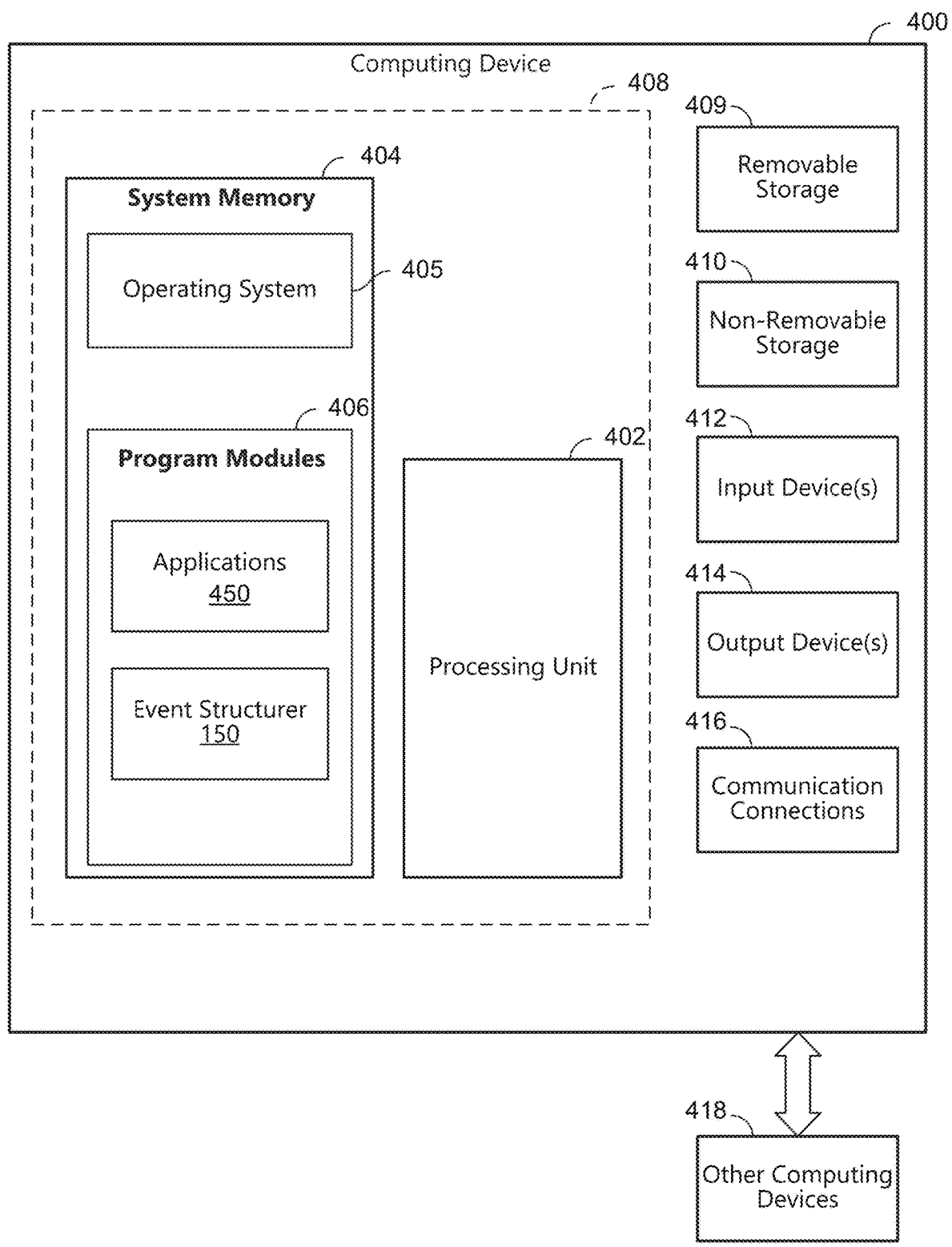
FIG. 4 is a block diagram illustrating example physical components of a computing device.
Figure 5A:
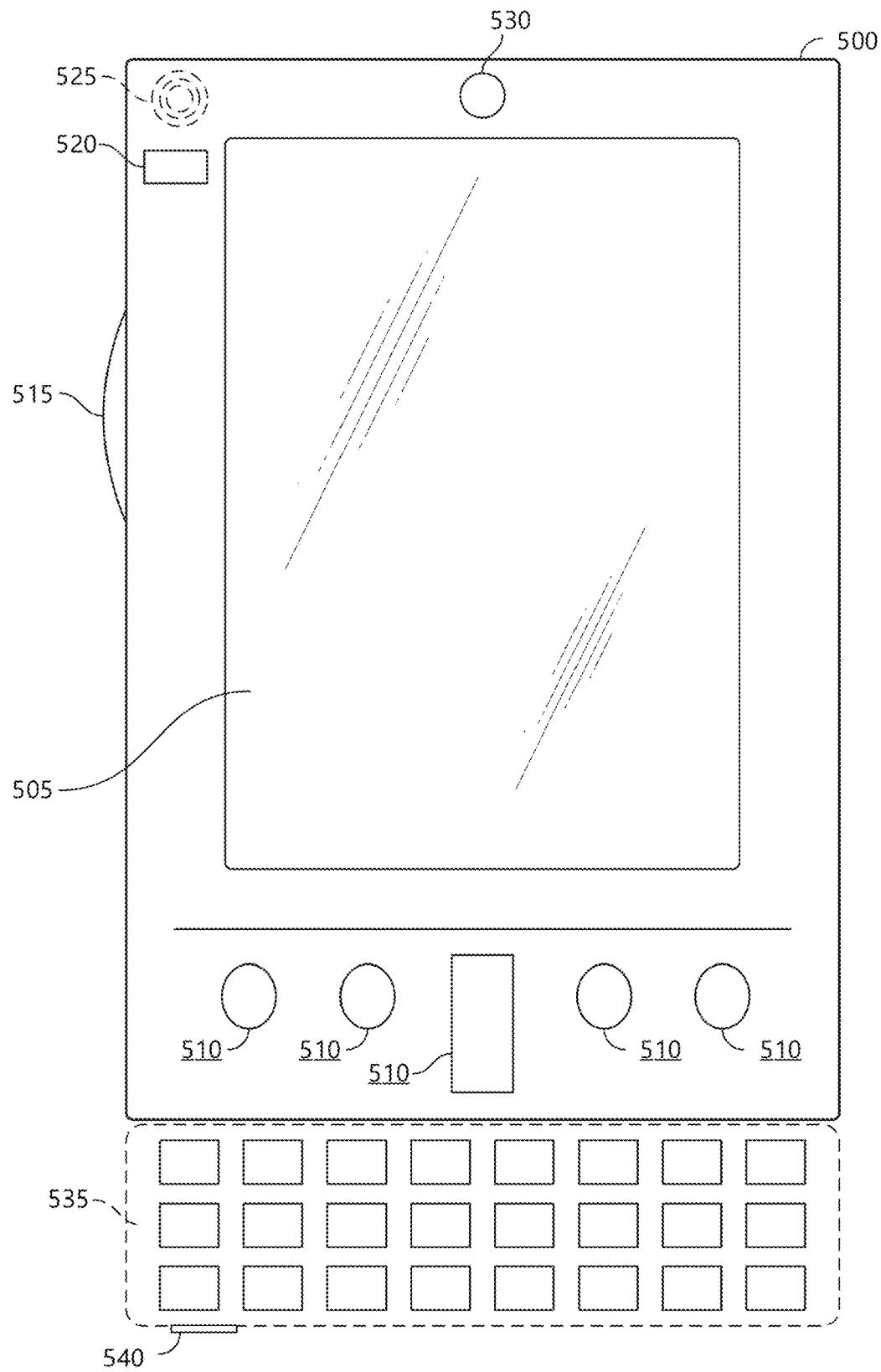
FIGS. 5A and 5B are block diagrams of a mobile computing device.
Figure 5B:
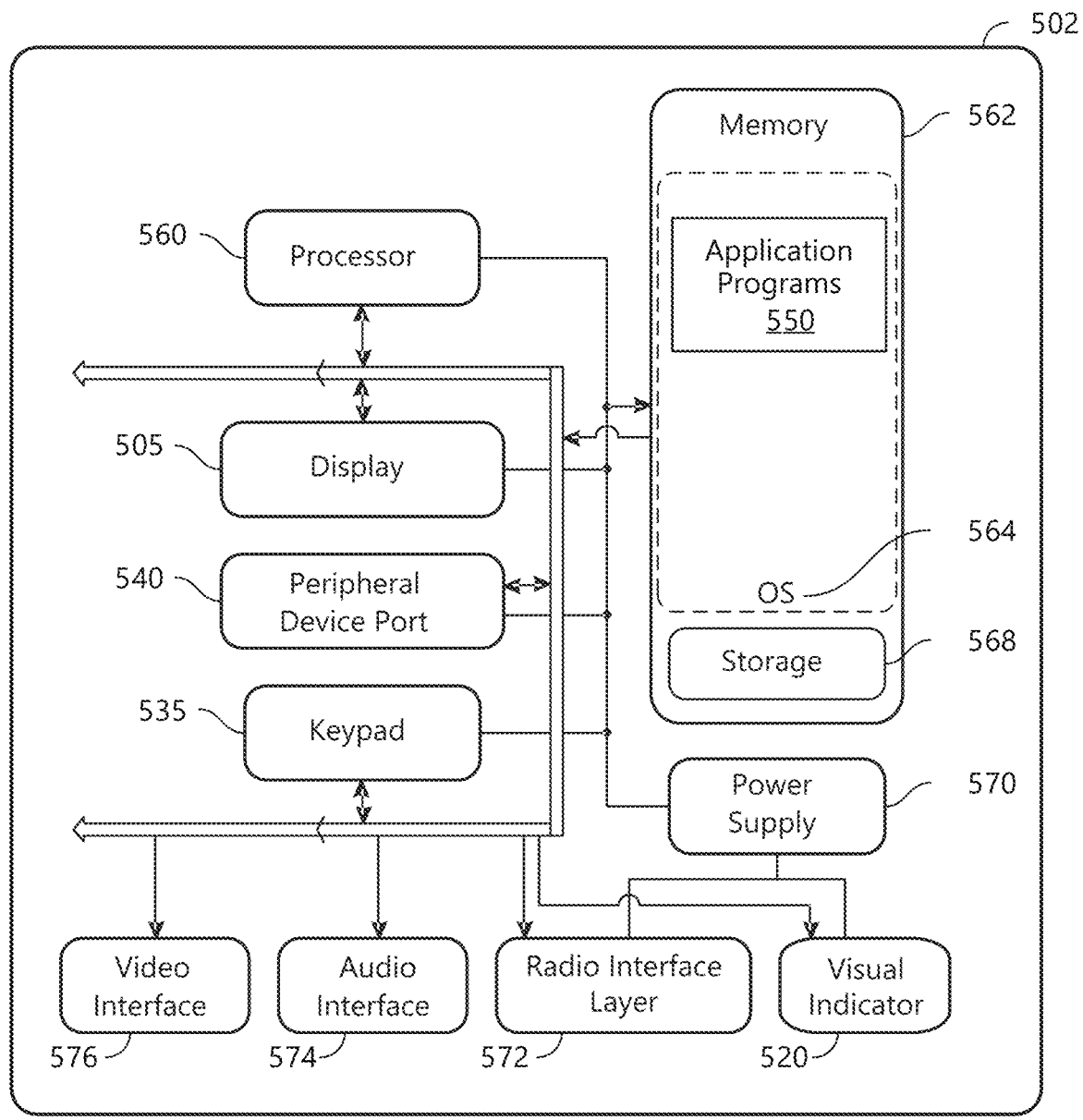
Figure 6:
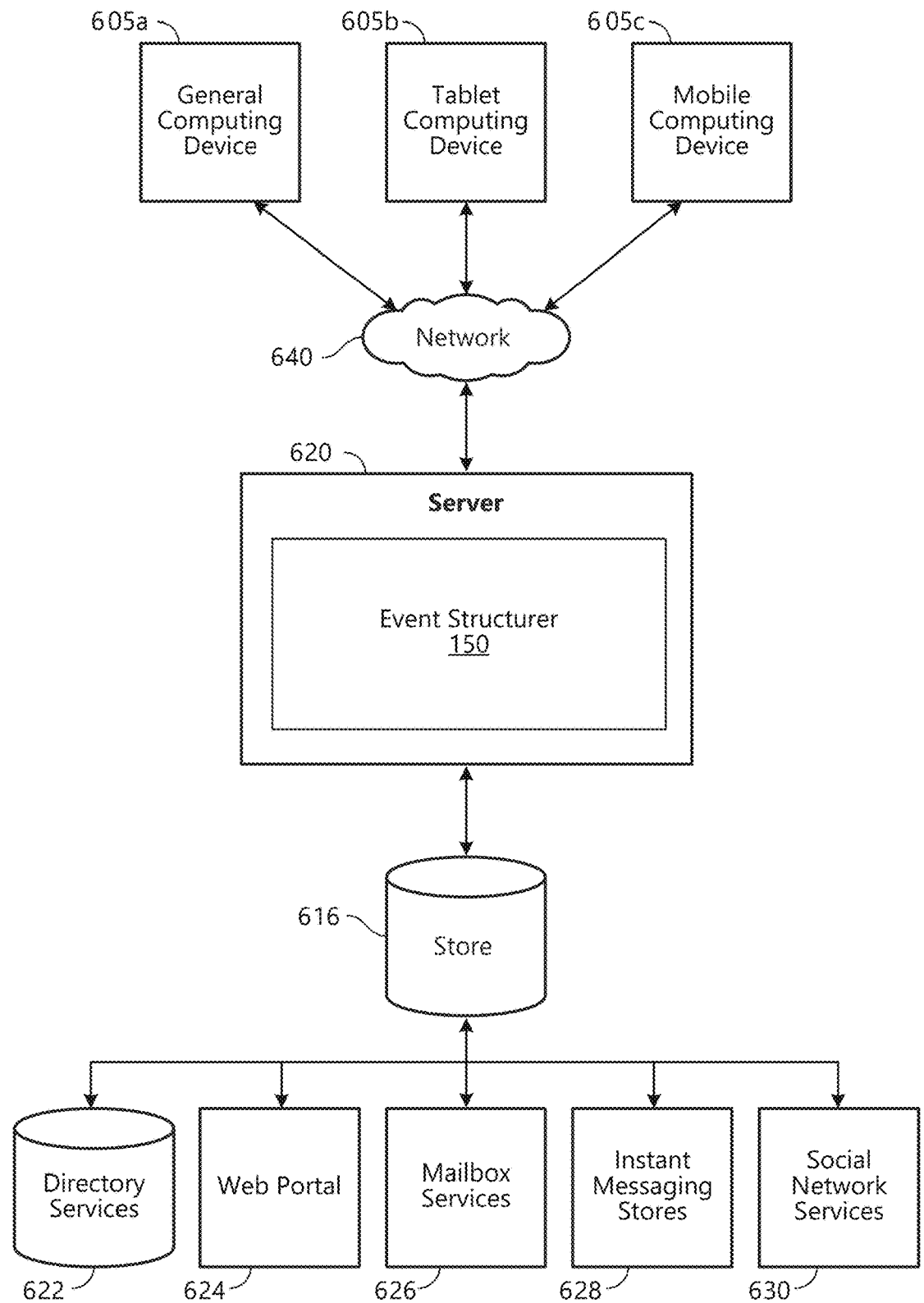
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes event structurer 150. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., event structurer 150) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for sharing events with structured metadata as described above. Content developed, interacted with, or edited in association with the event structurer 150 is enabled to be stored in different communication channels or other storage types. For example, various documents may be stored using a directory service 622, a web portal 624, a mailbox service 626, an instant messaging store 628, or a social networking site 630. The event structurer 150 is operative to use any of these types of systems or the like for sharing events with structured metadata, as described herein. According to an aspect, a server 620 provides the event structurer 150 to clients 605a,b,c. As one example, the server 620 is a web server providing the event structurer 150 over the web. The server 620 provides the event structurer 150 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for sharing events with structured metadata comprising:
a processor;
a memory storage device including instructions that when executed by the processor provide an event structurer configured to:
receive a message transmitted from a sender to an original recipient that is related to an event for the original recipient;
parse the message to identify metadata of the event;
create a calendar item for the original recipient based on the metadata;
receive, from the original recipient, a share action identifying a new recipient;
receive, from the original recipient, a selection of a portion of the metadata relevant to the new recipient;
incorporate the selected portion of the metadata relevant to the new recipient into a shared message; and
cause transmission of the shared message to the new recipient.

2. The system of claim 1, wherein the shared message is a calendar event invitation.

3. The system of claim 1, wherein the metadata are incorporated into the shared message as a machine-readable division of an HTML (Hypertext Markup Language) body section of an email.

4. The system of claim 1, wherein the event structurer is further configured to:
identify enrichment data in an enrichment database related to the metadata parsed from the message; and
insert the enrichment data into the shared message to enrich the metadata.

5. The system of claim 4, wherein the enrichment data include at least one of:
a map;
a hyperlink to a website; and
a full name of an entity described in the message by a code.

6. The system of claim 1, wherein the selection of a portion of the metadata relevant to the new recipient is received as a selection of a user interface element from a displayed menu.

7. A method for sharing events with structured metadata comprising:
receiving an email transmitted from a sender to an original recipient;
parsing the email to identify metadata associated with an event related to the original recipient;
creating a calendar item for the original recipient based on the event;
receiving, from the original recipient, a share action identifying a new recipient;
receiving, from the original recipient, a selection of a portion of the metadata relevant to the new recipient;
creating a shared message, the shared message including the portion of the metadata relevant to the new recipient and an indicator that the shared message is a shared event; and
transmitting the shared message to the new recipient.

8. The method of claim 7, further comprising causing a display of an options menu with a plurality of templates corresponding to different pre-selected portions of metadata to share.

9. The method of claim 8, wherein the selection of the portion of the metadata relevant to the new recipient is received as a selection of one of the templates in the options menu.

10. The method of claim 8, wherein one of the plurality of templates is a user-defined template.

11. The method of claim 7, further comprising upon receiving the share action, causing a display of a suggested template corresponding to a pre-selected portion of metadata to share.

12. The method of claim 11, wherein the selection of the portion of the metadata relevant to the new recipient is received as a selection of the suggested template.

13. The method of claim 7, wherein the shared message includes a message defined by the original recipient.

14. The method of claim 7, wherein the shared message includes a forwarded copy of the email.

15. The method of claim 7, wherein the shared message is an e-mail.

16. A method for sharing events with structured metadata comprising:
receiving a message transmitted from a sender to an original recipient that is related to an event for the original recipient;
identifying metadata of the event;
creating a calendar item for the original recipient based on the metadata;
receiving, from the original recipient, a share action identifying a new recipient;
receiving, from the original recipient, a selection of a portion of the metadata;
receiving, from the original recipient, a share action identifying a new recipient;
generating a shared message with the selected portion of the metadata; and
transmitting the shared message to the new recipient.

17. The method of claim 16, wherein the shared message includes a forwarded copy of the received message.

18. The method of claim 16, further comprising causing a display of an options menu with a plurality of templates corresponding to different pre-selected portions of metadata to share.

19. The method of claim 18, wherein the selection of the portion of the metadata relevant to the new recipient is received as a selection of one of the templates in the options menu.

20. The method of claim 16, further comprising upon receiving the share action, causing a display of a suggested template corresponding to a pre-selected portion of metadata to share.

* * * * *